Figure 1:
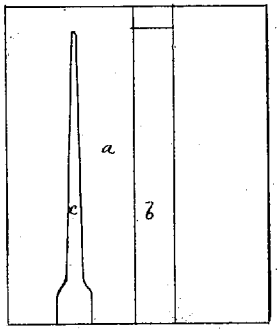

S. E. CHASE.

Finishing Horse-Shoe Nails.

No. 5,207. Reissued Dec. 31, 1872.

Witnesses.
M. W. Frothingham.
S. B. Kidder

Globe Nail Company,
Assignee of S. E. Chase, by
Crosby & Gould, Att'ys

N. PETERS, Photo-Lithographer, Washington, D. C.

UNITED STATES PATENT OFFICE.

S. E. CHASE, OF BOSTON, MASSACHUSETTS, ASSIGNOR TO THE GLOBE NAIL COMPANY.

IMPROVEMENT IN FINISHING HORSESHOE-NAILS.

Specification forming part of Letters Patent No. 78,644, dated June 9, 1868; Reissue No. 5,207, dated December 31, 1872.

*To all whom it may concern:*

Be it known that S. E. CHASE, of Boston, in the county of Suffolk and State of Massachusetts, has invented an Improvement in Finishing-Nails, of which the following, taken in connection with the drawing which accompanies and forms part of this specification, is a description sufficient to enable those skilled in the art to practice it.

This invention relates to processes or methods of operation in finishing nails which gives to them a desirable curvature throughout the body, and a beveled and pointed form at one end. The nails to be finished are those which are used for securing shoes to the hoofs of animals, which nails are taken, when made by hand or otherwise, and are by this process finished, as regards curvature and pointing, by mechanism, instead of by hand.

It is well known to shoers of animals that they have to manipulate each of the nails which they use for shoeing, to give to them a proper curvature and point, to make it certain that each nail driven by them into a hoof shall come out of the hoof on the outside at the proper height from the sole, so as to prevent injury to the animal by the nail entering the sensitive part of the hoof. This manipulation is now generally performed by the hand-hammer, which, in giving the bevel which forms the point, spreads the material of the nail at the point, which is objectionable.

The invention consists in the following processes: First, the nails, in a nearly-finished condition as to form, whether brought to such condition by hand-forging or by the operation of mechanism, are beveled at their ends by pressure or percussion, which spreads out the metal on either side, and then the spread beveled end of each nail is brought to a point by a cutting operation, which removes from each side of the point the superfluous metal which was previously spread in the act of forming the bevel; second, the nails, in a nearly-finished condition as to form, whether brought to such condition by hand-forging or by the operation of mechanism, are submitted, on an anvil or bed of proper form, to the action of a die of proper form, which will give the nail the proper longitudinal curvature in one direction, or flatwise of the nail, and the bevel at the point end, the superfluous metal at the end of the nail being spread out on each side of the point; then the nail, properly curved, and with the point beveled but spread on each side, is submitted to the action of a die, which forces the nail through a hole in a bed, the outline of the die and of the hole in the bed corresponding and acting as shears to shear or cut the nail at its point to the exact form desired in a finished nail, by removing from the sides thereof the surplus metal which has been spread by the action of the beveling-die, and the nail is thus not only trimmed sidewise, but, by being forced through the open die-hole under the salient die, is straightened sidewise.

It is not new to finish the points of nails by filing, or by grinding, or by hammering, or by shearing, cutting, or punching alone; nor is it new to finish nails by inclosing them in a matrix (in which the point is brought to a bevel by the operation on the nail in the matrix) of a rolling-die, which operates not to spread the metal at the point, but to condense it, as shown in the United States Patent No. 62,682, so that it will be understood that no claim is made to said processes of finishing nails.

In the process last referred to, as set forth in the United States Patent No. 62,682, the great objection is that the die and matrix soon give out under the severe strain requisite to condense the metal in the matrix to form the beveled point, while in my process, the nail being uninclosed when the die bevels the point, the metal spreads, and then the surplus is removed at a subsequent separate operation at another location.

The drawing only represents the parts immediately concerned in the operation of pressing the nail to curve its body and to bevel its point, and the parts employed in shearing the end of the nail at and in the vicinity of the point.

The press by which said parts are worked may be of any known form which will give the requisite movements with sufficient power, and forms no part of my present invention.

The nails may be presented to the curving and beveling die, and to the shearing-die and its co-operative open matrix, by hand or by an automatic feed; but as an automatic feed is not the subject of the invention sought to be patented, nothing further will herein be said with reference thereto.

Figure 2:
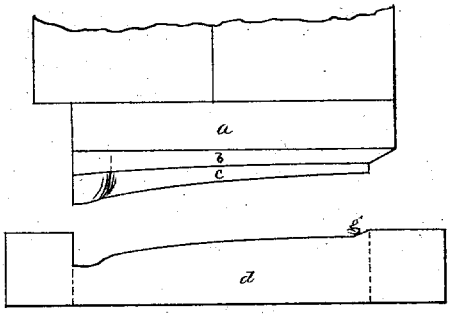
Figure 3:
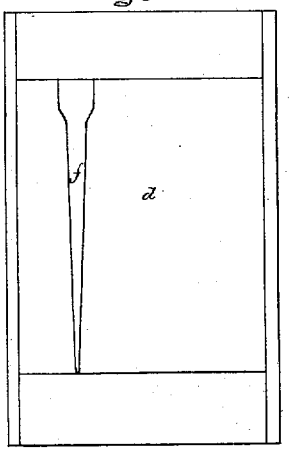
Figure 4:
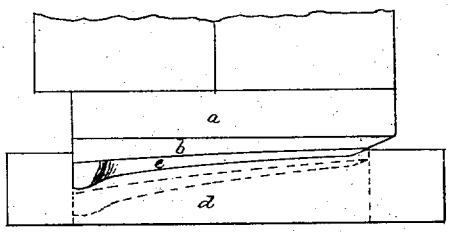
Figure 5:
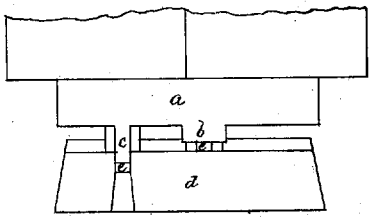

In the drawing, Figure 1 shows an underneath or reversed plan of the piece *a*, carrying the curving and point beveling die *b* and the shearing-die *c*. Fig. 2 shows in elevation the piece *a*, and the dies *b* and *c*, and the bed or anvil *d* on which the nail *e* is curved and beveled at *g*, and in which bed is made the open die seen in Fig. 3 at *f*, said figure being a top plan of the bed or anvil *d*. Fig. 4 shows in elevation the same parts that are shown in Fig. 2, but they are in the position in which the pressing-die *b* is acting on a nail, *e*, on the surface of bed *d*, and the die *c* is acting to force a nail through the opening *f*. Fig. 5 is a sectional view, showing the parts in the position which they have in Fig. 4.

The flat side of the nail is the side presented to the action of the dies *b* and *c*, the bed *d* being made of the form of that surface of the nail having the projection of the head, the short bevel which forms the point of the nail being made in said bed at *g*. If a nail in a nearly-finished form is laid upon the bed beneath the die *b*, said die, in descending, will press the nail between its lower surface and the upper surface of the bed, giving the nail the general curvature shown in Fig. 4, and making a beveled end by widening the end. The nail in this condition being placed over the opening *f*, with the shape of which it nearly conforms, except at the end spread by beveling, the die *c*, at its descent, will force the nail through the opening *f*, shearing off any superfluous width, and leaving the nail in a condition in which it is ready for use, though it will be improved by a little rattling in a tumbler-barrel, which will quickly remove the disagreeable sharpness and fins from the corners of the nails.

*Claims.*

1. In finishing nails for animals' shoes, the process of beveling the small end of each by spreading the metal by pressure, and then removing the superfluous metal by cutting or shearing, substantially as and for the purpose specified.

2. The process of curving the bodies of nails and beveling their points by spreading the metal laterally, and afterward forcing them through an open die to shear off superfluous metal, substantially as and for the purpose specified.

ISAAC ADAMS,
*President.*

Witnesses:
FRANCIS GOULD,
M. W. FROTHINGHAM.